Oct. 18, 1938.  P. DEVAUX  2,133,657
DRAWING AND RETENTION MECHANISM FOR PREPARING AND SPINNING MACHINES
Filed Feb. 4, 1937  4 Sheets-Sheet 4
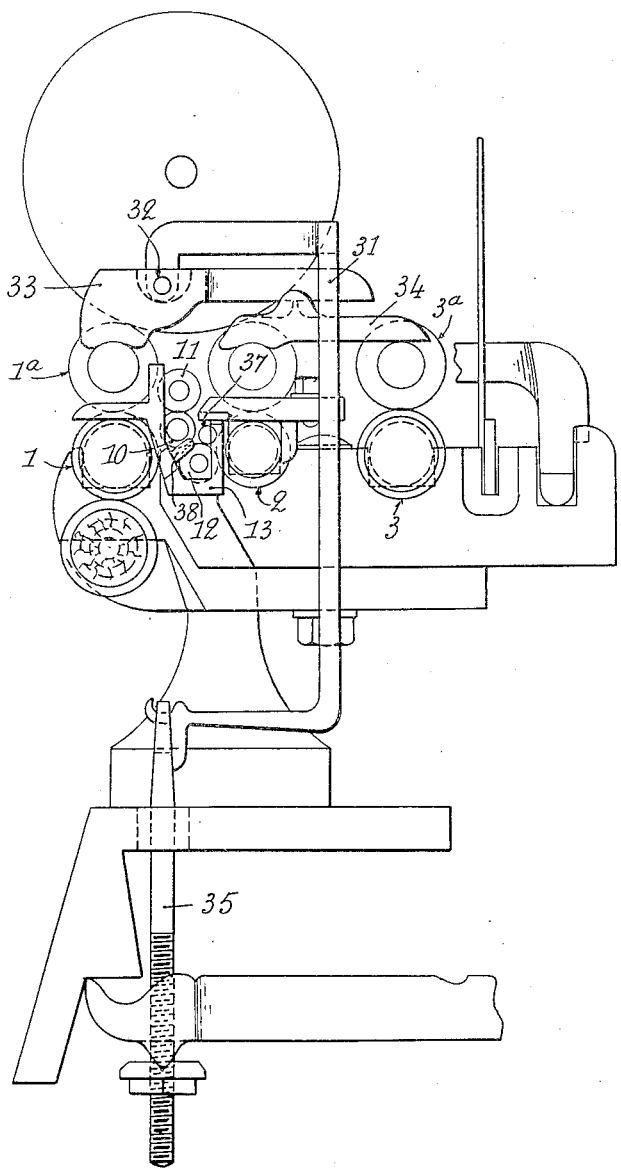
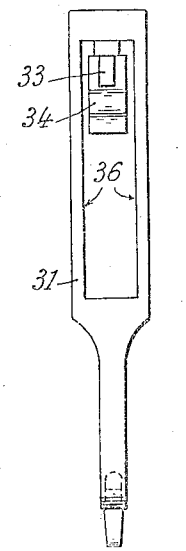
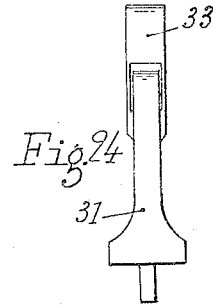

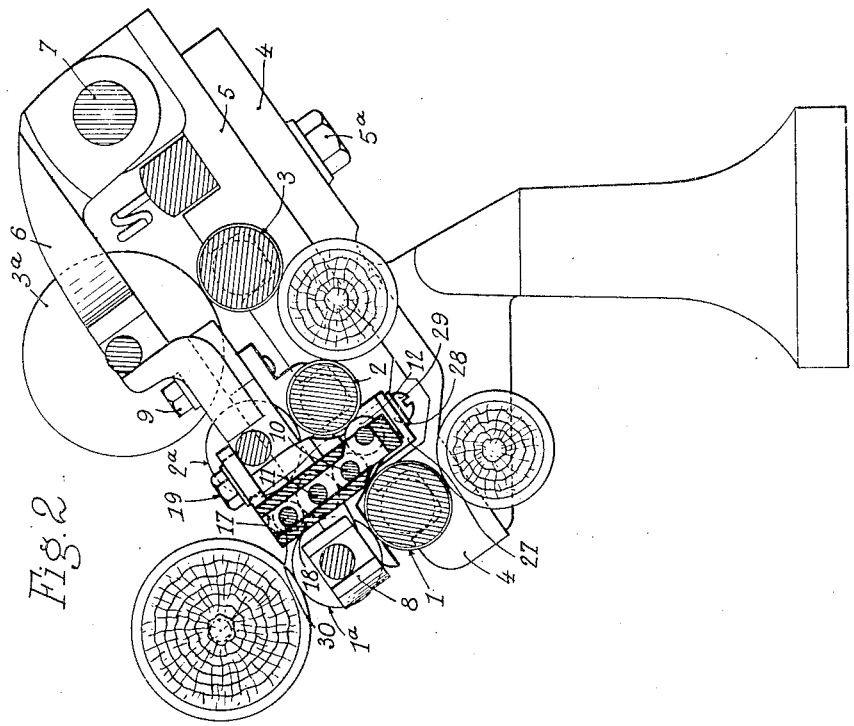
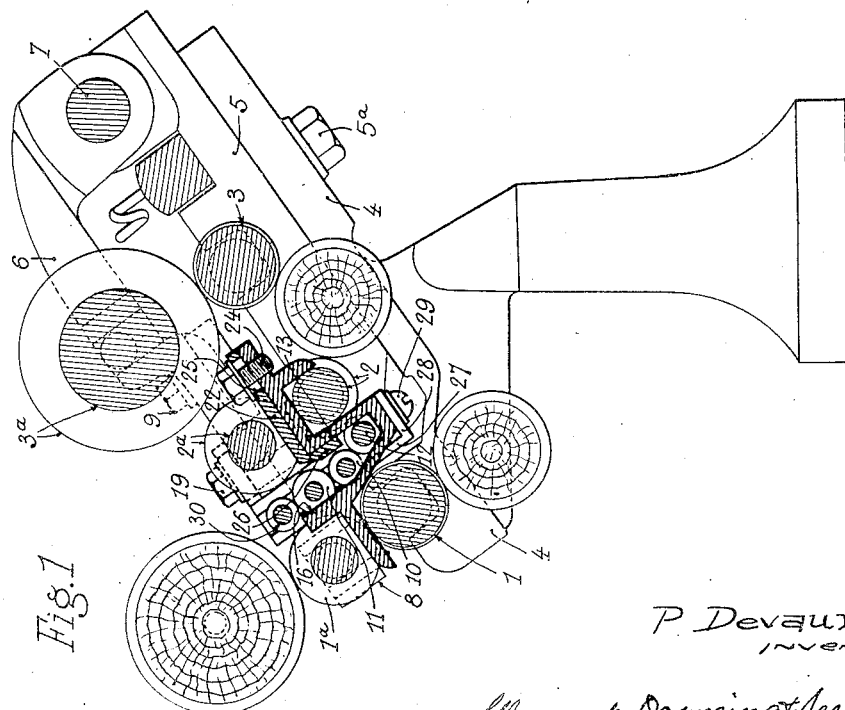

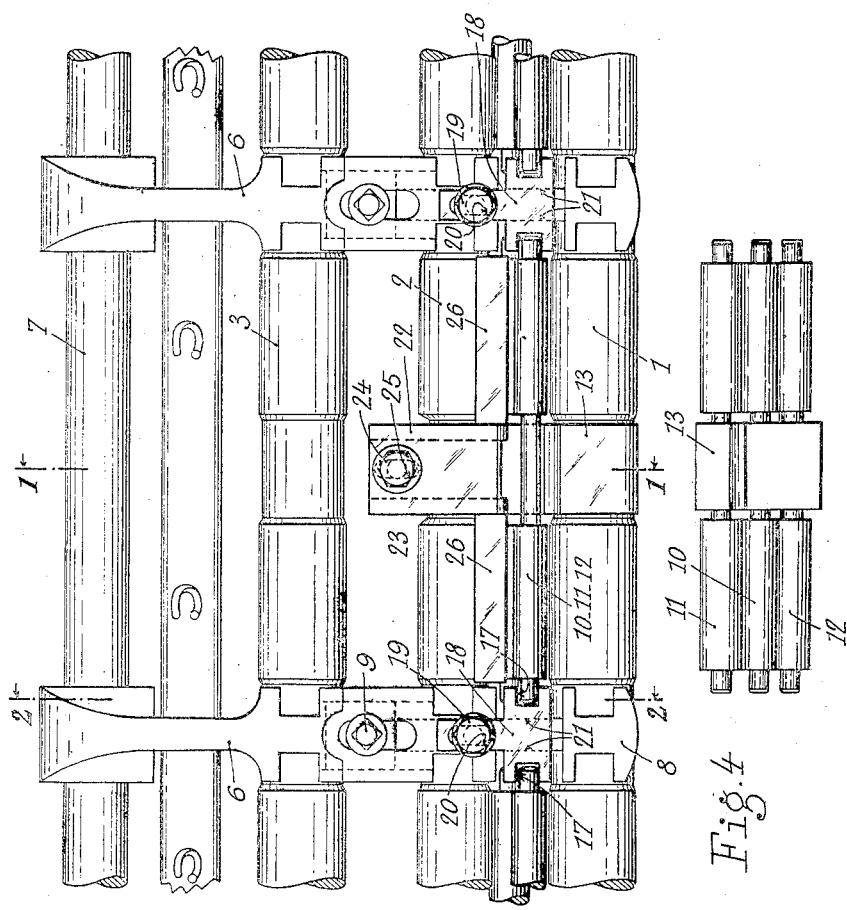

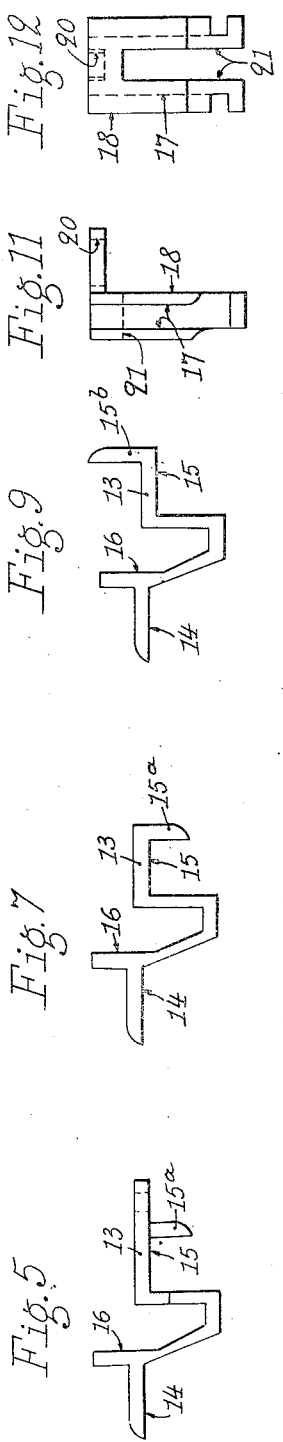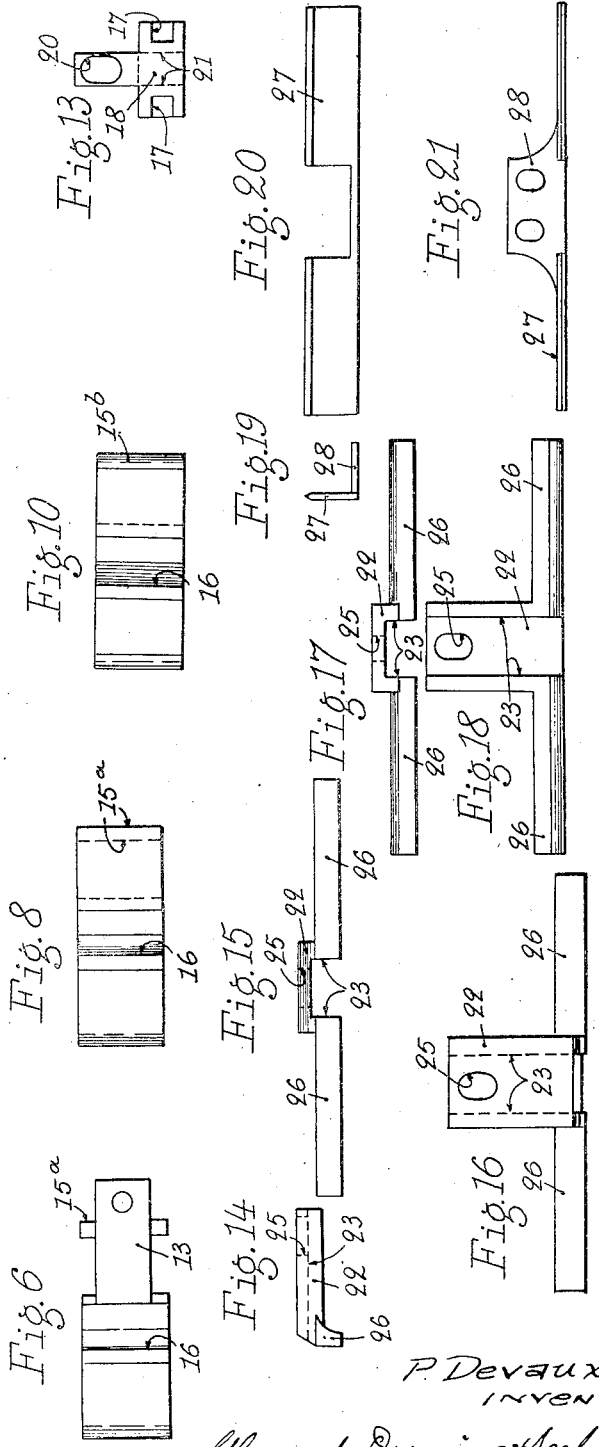

Patented Oct. 18, 1938

2,133,657

UNITED STATES PATENT OFFICE 2,133,657

DRAWING AND RETENTION MECHANISM FOR PREPARING AND SPINNING MACHINES

Paul Devaux, Maromme, France

Application February 4, 1937, Serial No. 124,100
In France April 28, 1936

13 Claims. (Cl. 19—130)

A drawing and retention mechanism for preparing and spinning machines is already known, in which rotary rollers of small diameter positively driven which are used in order to space, at about 16 mm., the nips of two consecutive pairs of rollers, consist of magnetic material and rest upon a driving shaft of normal diameter for spinning frames which is driven at its end or in like manner, the positive drive at the desired speed, being obtained by magnetic means by the use of a magnetic field passing through the small roller or rollers to be driven. The magnetic field is produced by one or more cylindrical permanent magnets having any suitable form and diameter, or by electro-magnets.

The said rollers of small diameter are subdivided into elements whose length is in proportion to their diameter and depends upon the strength required. According to the length which is adopted, they are held in place by the usual roller supports or by the lower part or base of the brackets or caps by which the upper rollers are supported.

In this known device, the permanent magnets used for the drive are mounted, in the form of sleeves upon the driving shaft, and this latter serves as an auxiliary shaft which is necessarily added to the machine.

The said rollers of small diameter are covered by the usual parts of such machines, and thus they are not readily accessible to the workers.

In order to permit, in many cases, of dispensing with the use of an auxiliary shaft, and further, in order to provide for a ready manipulation, the present invention has for its object an improved drawing and retention mechanism for preparing and spinning machines for cotton, wool, and in general for all other material, which mechanism, of the aforesaid type comprising small rollers adapted for magnetic drive, is chiefly characterized by the fact that the permanent magnets or electro-magnets, of any form and diameter (an elongated cylindrical form in the embodiment further described) which actuates the fluted or smooth rollers of small diameter, are driven by one of the usual shafts of the machine, which is actuated at its end, or in like manner. The said shaft may consist of one of the usual intermediate shafts of the machine.

According to another characteristic, the rollers of small diameter and the corresponding intermediate magnets or electro-magnets used for driving purposes are preferably subdivided into units of short length which serve only for a limited number of spindles, and forms sets which are independent, removable, and accessible when the machine is running or stopped, and which can also be readily removed and replaced without interfering with the parts which are adjacent each set.

For example, the said small rollers and the said magnets or electro-magnets have such lengths that they will correspond to two, four, six or eight spindles of a continuous or a self-acting machine (mule).

It is preferable that each set of small rollers with the corresponding magnets or electro-magnets should be surrounded by a central member which facilitates the manipulation.

Further charactristics of the invention will be set forth in the following description.

In the accompanying drawings, which are given solely by way of example:

Figs. 1 and 2 are vertical cross-sections, on the lines 1—1 and 2—2 of Fig. 3, of a mechanism in accordance with the invention (shown in heavy lines) in position upon a continuous spinning machine.

Fig. 3 is a corresponding plan view, in which the usual upper rollers are removed.

Fig. 4 is a view of the removable set consisting of the small rollers and the corresponding permanent magnet, which has been separated from the machine in order to show the independent character and the ready manipulation of this set, which is limited to two spindles.

Figs. 5 and 6 are elevational and plan views showing a form of construction of the member surrounding the said set at its middle part.

Figs. 7 and 8 show a modified form of said member.

Figs. 9 and 10 represent another form of the said member.

Figs. 11, 12 and 13 show respectively a side view, a front view and a plan view of one of the members adapted to maintain the said set at its ends.

Figs. 14, 15 and 16, 17, 18, are respectively side, front, plan, rear and bottom views, of an auxiliary member of the set for guiding the fibres and disposed at the central part of the set.

Figs. 19, 20 and 21 are respectively side, front and plan views of a member adapted for the cleaning of the small lower roller.

Fig. 22 is a elevational view of the rollers and usual parts of a drawing head for self-acting machine, as well as the mechanism in accordance with the invention as applied to the head, and the special pressure device which it may require.

Figs. 23 and 24 are elevational and plan views of this pressure device.

In the embodiment shown in Figs. 1 to 3, the drawing head for the spinning comprises, as in one of the usual forms, drawing rollers 1 and 1a, intermediate rollers 2 and 2a, and feed rollers 3 and 3a. The bearing parts of the lower roller 1 rest upon the frame 4 of the drawing head. The lower rollers 2 and 3 rest upon the member 5 whose position is adjustable with reference to the roller 1, by sliding upon the frame 4. The journals of the upper rollers 2a and 3a are located in grooves in the cap arms 6 which are pivotally mounted on a bar 7.

As to the roller 1a, its journals are located in grooves in the blocks 8 which are secured by screws 9 to the cap arms 6.

In order to accompany the fibres of the roving as near as possible to the nip of the drawing rollers 1—1a, for instance at 16 mm. distance, there are mounted between the pairs of rollers 1—1a and 2—2a, two rollers 10 and 11 whose diameter is reduced to the necessary degree and which consist of magnetic material. The roller 10 is rotated without torsion or flexion by a cylindrical permanent magnet 12. The said magnet is in contact with a driving shaft having the normal diameter for spinning frames either existing or added, this being the intermediate roller 2 in the present construction.

The magnet 12 and the rollers 10—11 can be divided into sections of any desired lengths, but in addition to the technical results obtained with the material under treatment, it will be evidently of advantage to the workers in the spinning factory that a device of this kind should be of a most practical construction, thus the magnet 12 and the rollers 10—11 are divided into short sections, as herein represented, for example, by employing elements whose length corresponds to two spindles of the continuous spinning frame.

In order to afford a ready access to the set 10—11—12 during the operation as well as when stopped, a member 13 is used (Figs. 1, 3, 4, 5, 6) which forms a bridge between the rollers 1 and 2, and bears by its faces 14—15 (Fig. 5), and also by a lug 15a, upon the smooth parts of said rollers 1 and 2, between two fluted parts which work together. As shown in Fig. 4, the said member permits of removing and replacing the complete set 10—11—12 when only the upper delivery roller 1a has been removed.

In each set, if the smooth parts located between the two fluted parts have a sufficient length relatively to the length of the rollers 10—11 and of the magnet 12, the said member 13 may serve to secure the rollers 10—11 and the said magnet 12 in position. In this case, the rollers 10—11 will rest upon the front wall 16 of the said member 13, and herein the magnet 12 is free to move in depth, but is maintained laterally and also in height.

On the contrary, if the smooth parts between two fluted parts have not a sufficient length with reference to the length of the rollers 10—11 and of the magnet 12, said rollers and magnet will preferably be out of contact, when running, with the member 13, whose only object is now to provide for the simple and ready removal and replacing of the said parts. In this case, the rollers 10 and 11 and the magnet 12 are held in place by journals situated in lateral grooves 17 in the members 18 (Figs. 2, 3, 11, 12, 13).

Each member 18 forms a fork at 21, as shown in Figs. 3, 11, 12 and 13, thus giving passage to the arm of the block 8 supporting the front roller 1a, and the said fork bears upon the edges of said arm in order to avoid any lack of parallelism between the rollers 10—11 and the magnet 12, relatively to the usual rollers.

Each member 18 can be secured to one of the arms 6, as shown in Figs. 1, 2 and 3, by a screw 19 passing through a slot 20 in the member 18, if the corresponding width of the arm 6 is sufficient, or by the existing screw 9 (Figs. 1, 2, 3) securing the corresponding block 8 for the front rollers 1a, if the arm 6 is too narrow, or by any other device, but this latter should preferably form part of the cap arm 6. As the adjustment of the distance between the rollers 10 and 2 is either permanent or is made in each case for a given class of work, the range for the slipping of the fibres may be obtained, if necessary, by the adjustment of the distance between the rollers 1 and 10, simply by the screw 5a which secures the carriages 5, by the use of a slot in the frame 4 (Figs. 1 and 2). The front blocks 8 are then placed in the required position on the rollers 1, without acting upon the members 18.

It is to be noted that if it should be so desired, it is possible to provide for an adjustable spacing between the rollers 10 and 2 by a slide arrangement, not shown, of the central member 13, this being allowed by the member 18 by means of its slot 20.

As above stated, the central member 13 permits of removing and replacing the members 10—11—12 as a whole.

It is preferable, in order that the workers, during the operations, shall not change the position of the rollers 10—11 and the magnet 12, and also to ensure the passage of the roving from the roller 2 to the roller 10 when preparing for starting or in case of breakage of the roving, or the like, that the member 13 shall be provided at the top with a member 22 (Figs. 1, 3 and 14 to 18). The said member is adjustable in position upon the member 13, upon which it is slidable by means of a groove 23 which is placed upon the said member. This device is secured by a screw 24 which is screwed in the member 13 and passes through a slot 25 in the said member 22.

The member 22 comprises two wings 26 which serve with their upper faces as a bridge between the rollers, and with their lower faces as a cover for the magnet 12. Due to these wings, the said magnet 12 is held in the member 13, and cannot be removed, so that it will never be mistaken for one of the cylinders 10—11.

If it should not be found necessary to use the bridge wings of the member 22 in order to guide the fibres, and if it is only desired to prevent the said magnet 12 from leaving the member 13, the said wings can be eliminated, and it is simply necessary to provide a central projection upon the member 22, and said projection will serve as a cover upon the central part of the magnet 12.

In order to ensure the clean condition of the roller 10 in a constant and automatic manner, use may be made, as herein represented, of a member 27 (Figs. 1, 2, 19, 20, 21) having the form of a knife which is in light contact with the roller 10 upon the whole length of the parts to be cleaned, and is secured under the member 13, for instance by means of a central lug 28 and screws 29, or by like means.

The upper roller 11 can be kept clean by a cleaning roller 30 (Figs. 1 and 2).

The members 13, 18, 26 and 27, adjacent the magnet 12, will preferably consist of non-magnetic material.

It should be noted that the central member 13 is not only suitable, as to its form, for the spinning frame with which it is to be used, but on the other hand, it may have a different design from the one represented in Figs. 1 to 6, without departing from the spirit of the invention.

Thus it will be observed that while Figs. 7 and 8 show a modified form having neither a bridge nor a cover for the magnet 12, but so arranged as to be held in place by the roller 2 by means of the lug 15a, Figs. 9 and 10 show another modification adapted for maintenance by the upper roller 2a by means of an upwardly extending lug 15b.

It is obvious that either one of these embodiments can be utilized, or they may be used together, in parts, or again, various other constructions can be employed which will serve the same purpose.

Figs. 22 to 24 show the application of the invention to a self-acting machine (mule).

The usual pressure hooks of the self-acting machines descend vertically at the rear of the rollers 1, and due to this fact, they might offer prejudice to the good working of the rollers 10 in case the nips should be brought very near together. In this event, according to the invention, each of the said hooks may be replaced by a member 31 forming a bracket, which is pivoted (or not) at 32, at its junction with the member 33 which bears directly upon the roller 1a and also, through the medium of a known member 34, upon the rollers 2a and 3a.

The said bracket passes between the rollers 2, 2a and 3, 3a and is fitted to the draw-rods 35 and other usual pressure devices employed with these machines.

If a central member is used for each set 10—11—12, the bracket 31 is cut out at 36, as shown in Fig. 23, in order that the member 13 may pass through the same without contact.

In this construction, which relates to a mule, there is provided, as a modification, a cleaning roller 37, in contact with the roller 10 and the magnet 12.

The said roller 37 is maintained laterally in position by the sides of the member 13 and/or of the members 18. It can be readily removed, together with the whole set 10—11—12.

With the use of the said cleaning roller 37, the wings of the member 22 are reduced in thickness in order to allow an entire freedom of working for this roller, as shown in Fig. 22, and for this purpose the magnet 12 is held in the member 13 by the projection above mentioned as a modification, or by a pin, or by a screw-stud 38 mounted in the member 13, as shown in Fig. 22.

In the embodiment shown in Figs. 1 to 3, and also in the embodiment shown in Fig. 22, the positive driving of the roller 10 is ensured by the molecular attraction of the permanent magnet 12, without any loss by slipping; the power of this magnet is chiefly proportional to its section, to the material employed, to its form, and its length. Thus all of these factors may be mutually combined in order to obtain the desired power.

In the last two constructions above mentioned, the goods under treatment are supported and conducted by the roller 10, whose surface speed is equal to that of the roller 2, whatever be the diameter of the magnet 12, and this is a normal feature as concerns the accompanying and the retention of the fibres by the roller 11, but it may be desired, in certain particular cases, that the roller 10 shall have a surface speed which is greater than that of the roller 2.

For this purpose, it is possible, for each set 10—11—12, to provide, at the right and left hand of each fluted part of the rollers 2, or only at the right hand end and the left hand end of these two fluted parts coupled together, suitable driving ribs or discs whose diameter is larger with reference to that of the fluted parts, according as it is desired to obtain a difference between the surface speeds of the rollers 10 and 2; the magnet 12 is driven by such ribs or discs, and in this case the roller 2a is cut out as it may be necessary, for the passage of the said discs.

Thus for instance, with a roller 2 of 19 mm. diameter provided with driving ribs of 23 mm. actuating a magnet of 10 mm. which in turn drives a roller 10 of 9 mm. diameter, the said roller 10 will have a surface speed $$\frac{23}{19}$$

or 1,21 times the surface speed of the 19 mm. fluted parts of the roller 2 which operate upon the material.

It is further possible to increase the difference between the surface speeds of the rollers 2 and 10 by increasing the diameter of the ribs, but also by increasing the diameter of the magnet 12 in the space thus left between said ribs.

For instance, the 23 mm. ribs may actuate a magnet having 10 mm. diameter at its corresponding bearing parts, and 12,5 mm. (in order to obtain the necessary play for their good working) at its normal part, which part actuates the roller 10 and the latter will thus have a surface speed, which is $$\frac{23}{19} \times \frac{12,5}{10}$$

that is approximately 1,5 times that of the fluted parts of the roller 2.

Furthermore, these differences of speed, or greater differences, can be obtained by the use of an auxiliary driving shaft for the magnets 12 of the different sets, which shaft is itself driven at the proper speed. The shaft is recessed for the passage of the bottom part of the member 13, if this latter member is used, and the shaft will be entirely cylindrical if use is only made of the retaining pieces 18 located at the ends.

The rollers 10—11 and the magnets 12 may be smooth or fluted, or striated, or may carry gear teeth, etc., as well as the aforesaid ribs.

It is obvious that the rollers 10—11 and the magnets 12 may be made in one piece or may consist of rings or sleeves which are loose upon a shaft or keyed to the same.

They will have diameters, whether equal or unequal, which are suitable for the work required of each roller. The magnets 12 must assure the transmission of the movement, the rollers 10 must be such that they can come sufficiently close to the rollers 1 while maintaining the play required for their proper working, and the rollers 11 must have a suitable weight according to the required effects, either of retention or of draft, taking place upon the material.

In order to prevent the workers from improperly placing the rollers 10 and 11 if these are different, they may be distinguished from each other, if they have but little difference in diameter, for instance by colouring their central recess which is in an empty space, and as the two rollers are thus interchangeable, the same set can be used for all the work of the spinning factory, the pressure or the retention being effected by the heaviest or the lightest roller according to the work to be performed.

In case of insufficient weight of the roller 11, which is limited by the diameter required in view of the spacings and by the density of the material employed, it may be replaced by a permanent magnet which is similar to the magnet 12 and thus provides for the drawing of the material.

The driving magnet 12 and the pressure magnet may be differentiated by colouring them.

Since they are separated by the roller 10, their signs of polarity may coincide or be inverted.

Obviously, the said invention is not limited to the embodiments herein described and represented, which are given solely by way of example.

It will be noted that in the construction shown in Figs. 1 and 2, relating to a drawing head for continuous machine, the rollers 2ª are represented as pressing freely on the rollers 2, but this device, as well as its modifications, may be employed without change in the case of loaded rollers 2ª.

It is further possible, if it is desired to obtain very reduced spacings between the upper generatrices of the consecutive rotary rollers, to actuate by each of the existing or added shaft, a certain number of magnets angularly spaced with relation to said shafts, as well as the aforesaid rollers of small diameter, and thus the minimum spacing can be obtained.

The said devices and their modifications in accordance with the invention, which are particularly described in their application to two spindles of continuous machines and to four spindles of self-acting machines, may, however, be designed, for the sake of economy, for four or more spindles of continuous machines and for eight or more spindles of self-acting machines.

It is evident that the aforesaid devices and their applications are applicable to the existing machines for the preparation and spinning of cotton, wool, and the like, as well as to all machines which may be further constructed.

Having now described my invention what I claim as new and desire to secure by Letters Patent is:

1. With a drawing mechanism for textile fibres comprising at least one working roller, the combination of a substantially cylindrical magnet bearing on said working roller and adapted to be frictionally rotated by said working roller, a small roller of magnetic substance resting on said magnet and adapted to be frictionally rotated by said magnet, and means for exerting a pressure upon the textile fibres passing over said small roller.

2. With a drawing mechanism for textile fibres comprising two cooperating rotatable drawing rollers and an auxiliary rotatable roller adapted to support and to guide the textile fibres before their passage between said drawing rollers, the combination of a substantially cylindrical magnet disposed between said auxiliary roller and the lower drawing roller and bearing on said auxiliary roller, whereby said magnet is adapted to be frictionally rotated by said auxiliary roller, a small roller of magnetic substance resting on said magnet close to the nip of said drawing rollers and adapted to be frictionally rotated by said magnet, and means for exerting a pressure upon the textile fibres passing over said small roller.

3. With a drawing mechanism for textile fibres comprising two cooperating rotatable drawing rollers and an auxiliary rotatable roller adapted to support and to guide the textile fibres before their passage between said drawing rollers, the combination of a number of successive independent groups in line between said auxiliary roller and the lower drawing roller each comprising a substantially cylindrical magnet bearing on said auxiliary roller and adapted to be frictionally rotated by said auxiliary roller, a small roller of magnetic substance resting on said magnet close to the nip of said drawing rollers and adapted to be frictionally rotated by said magnet, and means for exerting a pressure upon the textile fibres passing over said small roller.

4. In a drawing mechanism according to claim 2, the further feature consisting in holding means surrounding said magnet, said small roller and said pressure exerting means, whereby said magnet, small roller and pressure exerting means are adapted to be inserted and removed as a whole into and from said drawing mechanism.

5. In a drawing mechanism according to claim 3, the further feature consisting for each of said groups in holding means surrounding said magnet, said small roller and said pressure exerting means, whereby each group may be inserted and removed as a whole into and from said drawing mechanism independently of the other groups.

6. In a drawing mechanism according to claim 2, the further feature consisting in a holding member resting on said lower drawing roller and on said auxiliary roller and surrounding said magnet, said small roller and said pressure exerting means, whereby said magnet, small roller and pressure exerting means are adapted to be inserted and removed as a whole into and from said drawing mechanism.

7. With a drawing mechanism for textile fibres comprising two cooperating rotatable drawing rollers and two cooperating auxiliary rotatable rollers adapted to guide the textile fibres before their passage between said drawing rollers, the combination of a substantially cylindrical magnet disposed between the lower auxiliary roller and the lower drawing roller and bearing on said lower auxiliary roller, whereby said magnet is adapted to be rotated by said lower auxiliary roller, a small roller of magnetic substance resting on said magnet close to the nip of said drawing rollers and adapted to be rotated by said magnet, means for exerting a pressure upon the textile fibres passing over said small roller, and a holding member resting on said lower drawing roller and on said lower auxiliary roller and surrounding said magnet, said small roller and said pressure exerting means, and provided with stop means adapted to bear on at least one of said rollers.

8. In a drawing mechanism according to claim 2, the further feature consisting in a holding member resting on said lower drawing roller and on said auxiliary roller and surrounding and supporting said magnet, said small roller and said pressure exerting means.

9. In a drawing mechanism according to claim 2, the further feature consisting in a holding member resting on said lower drawing roller and said auxiliary roller and surrounding at a distance the middle portions of said magnet, said small roller and said pressure exerting means, and bearing means adapted to support the ends of said magnet, of said small roller and of said pressure exerting means.

10. In a drawing mechanism according to claim 2, the further feature consisting in a holding member resting on said lower drawing roller and on said auxiliary roller and surrounding the middle portions of said magnet, said small roller and said pressure exerting means, and wings secured on said holding member and extending on either side of said holding member in parallel relation with said rollers and adapted to guide the fibres between said auxiliary roller and said small roller of magnetic substance.

11. In a drawing mechanism according to claim 2, the further feature consisting in a holding member resting on said lower drawing roller and on said auxiliary roller and surrounding said magnet, said small roller and said pressure exerting means and stop means carried by said holding member and adapted to maintain said magnet in said holding member.

12. With a drawing mechanism for textile fibres comprising a pair of cooperating drawing rollers and a pair of cooperating auxiliary rollers, the combination of a substantially cylindrical magnet bearing on the lower auxiliary roller and adapted to be rotated thereby, a small roller of magnetic substance resting on said magnet close to the nip of said drawing rollers and adapted to be rotated by said magnet, a pressure exerting roller resting on said small roller of magnetic substance, bearing means for the upper drawing roller, and supporting members adjustably secured on said bearing means and provided with lateral guiding means for the ends of said magnet, of said small roller and of said pressure exerting roller, whereby the distance of said magnet, said small roller and said pressure exerting roller from said drawing rollers may be adjusted simultaneously.

13. In a drawing mechanism according to claim 2, the further feature consisting in holding means surrounding said magnet, said small roller and said pressure exerting means, and a knife adjacent said small roller and adapted to clean said roller.

PAUL DEVAUX.